United States Patent [19]
Harris et al.

[11] 3,839,015
[45] Oct. 1, 1974

[54] PROCESS FOR SEPARATING AND COLLECTING METALS FROM ORE

[76] Inventors: Paul M. Harris; Shelby D. Adamson, both of c/o Mars Metals, Ltd., 2401 Shadow Hill Dr., Riverside, Calif. 92506

[22] Filed: Mar. 26, 1973

[21] Appl. No.: 344,845

[52] U.S. Cl. .................................. 75/11, 75/10 R
[51] Int. Cl. ............................................. C22d 7/00
[58] Field of Search .............. 75/11, 63, 10, 65, 68, 75/97

[56] References Cited
UNITED STATES PATENTS

| | | | |
|---|---|---|---|
| 2,847,295 | 8/1958 | Bretschneider | 75/10 |
| 3,607,221 | 9/1971 | Kibby | 75/10 |
| 3,721,611 | 3/1973 | Jones | 204/1 R |

*Primary Examiner*—L. Dewayne Rutledge
*Assistant Examiner*—Peter D. Rosenberg

[57] ABSTRACT

The process of receiving metal values from metal ladened matter comprising combining and mixing the matter with water to establish an aqueous solution and then establishing and passing electric arcs through the solution to melt, vaporize and/or render the values gaseous and to ionize said values whereby the values coalesce, are cooled by the water and condense therein in a free solid metal state and finally precipitating and separating the metals from the solution.

8 Claims, 1 Drawing Figure

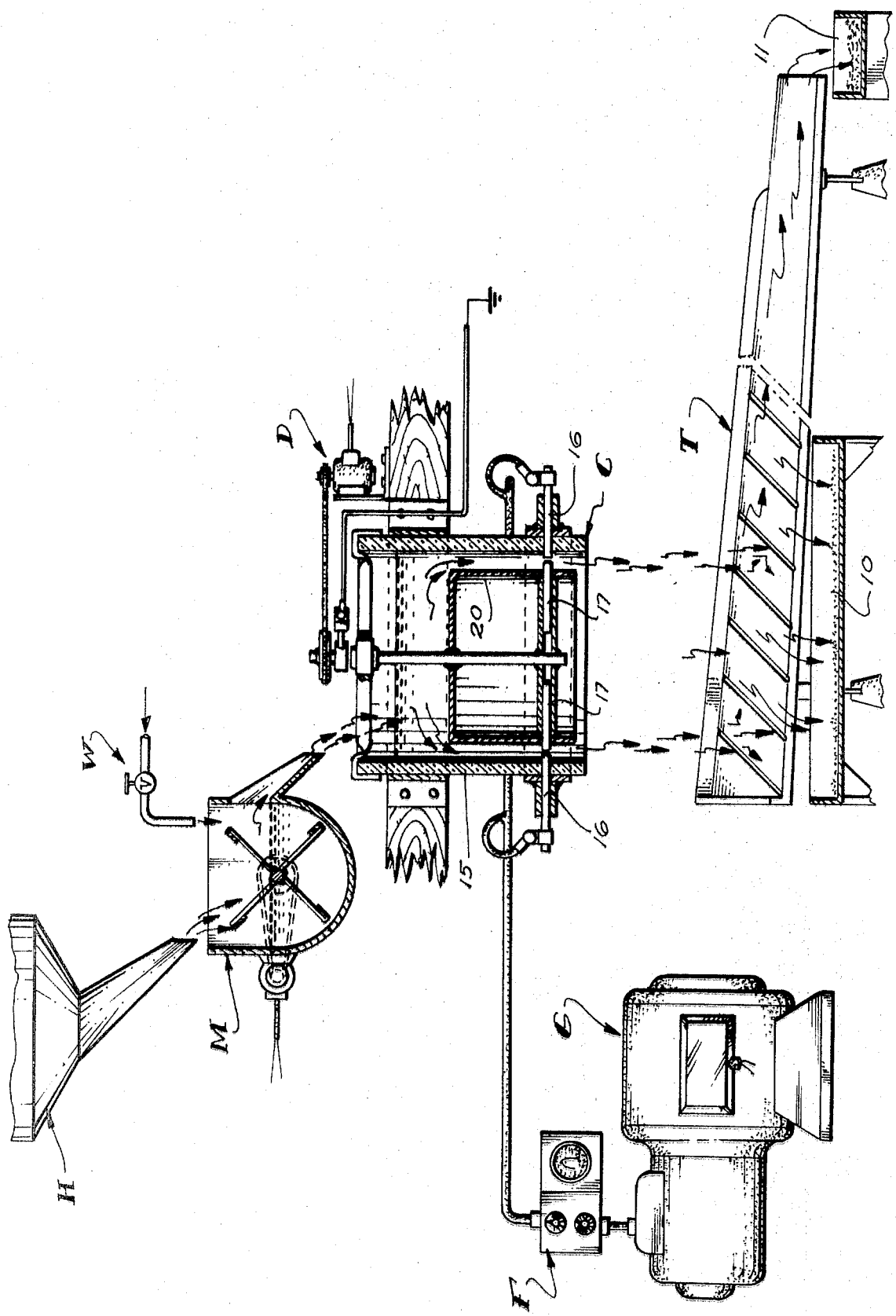

PROCESS FOR SEPARATING AND COLLECTING METALS FROM ORE

This invention has to do with the art of extractive metallurgy and is more particularly concerned with a novel process for effectively and efficiently separating metals and/or metal values from their ores.

In the art of extractive metallurgy, there has developed four basic classes or types of processes for separating metals from the ores. The most commonly practiced of these processes is called smelting and consists of subjecting the ore to heat or high temperatures which effects the desired separation. Another process is referred to as leaching and consists of dissolving metals out of their ores by chemical solvent and subsequently recovering the dissolved metal as by precipitation or galvanic means. Yet another process is referred to as electrolysis and consists of ionizing the metals or their dissolved salts by means of spaced anodes and cathodes in a bath containing the metal valves and thereby causing the metals to collect on the cathodes. Yet another process is referred to as amalgamation and consists of passing gold or silver ore, carried by a solution over plates covered with mercury whereby the mercury, which attracts the metals, combines therewith to form an amalgam. The amalgam is subsequently processed to separate the mercury and gold or silver.

Each of the processes identified above is well known to those skilled in the art to which this invention relates and are such that further detailed description and/or explanation thereof need not be provided at this time.

In practice, the process selected and employed to separate a metal from its ore is determined by the nature and characteristics of the metal to be separated and the nature and characteristics of the ore. In the case of certain metals and their ore, any one of the noted processes can be practiced effectively. In other cases certain of the processes are ineffecient or totally ineffective and but one of the processes can be effectively employed. In a notable number of instances, due to the often complex nature of certain ore, it is impossible or impractical to effectively separate metals from their ore by any one or more of the noted processes.

It is a known and generally recognized fact that in the course of practicing those processes for separating metals from their ore, noted above, less metal is collected or retrieved than is contained in the ore, as determined by standard assay procedures, and that a portion of the metal values which are known to be contained in the ore are lost in the course of carrying out those processes. It is understood and believed that those losses of values are the result of a notable portion of the metal values being carried away by escaping gases and/or waste fluids before they can be effectively collected and/or the inability of the process employed to effectively separate all of the known or determined values from their ore at a time during the course of the process and/or in such a manner that they can be effectively collected.

An object and feature of the instant invention is to provide a new and improved process for separating metals from their ore which is such that in most instances more of the metals are recovered that can be determined to be present in their ore by standard assay procedures and techniques.

It is an object and feature of this invention to provide a process for separating metal from its ore which alters and changes unstable near metal values of the ore to stable metal values whereby near or potential metal values not detectable as metal by assay are converted to a satable state or condition and are recovered.

As regards the physical nature of matter, it is an accepted and recognized theory that all matter is in a constant state of decay. Though the rate of decay is extremely slow, in the case of certain matter, such as metals, it is nevertheless taking place at all times and any particular element of matter, when detected or isolated is in fact in a transitory condition. In the case of metals, prior to becoming metal, they are in a crystalline state and are not readily detectable or identifiable as the metal which they will become, as decaying progresses. As metals decay or change to their next state or condition, as decaying progresses, they become isotopes of the metal they previously existed as.

When, for example, metallic matter is in a metallic state, it is in a most stable condition and its rate of decaying noticeably subsides, where as when it is in the pre-metallic crystalline an post-metallic isotopic states it is less stable, its rate of decay is more rapid and it is more readily altered or changed by external forces.

It is another, generally accepted theory that all matter is in fact made up of energy and that the decaying which takes place is the result of the gradual loss of energy from the matter, as by the escape of electrons, which works to change its atomic weight and number. In this regard, each element of matter is known to have its own, special and unique frequency and harmonics which can be readily duplicated or approximated electrically.

It is known that by subjecting matter to appropriate electrical frequencies and setting up of appropriate harmonics in and throughout the matter, it can be effectively broken down and its nature or state altered. In this respect, it is believed that the rate of decay of the matter is accelerated by the harmonic frequencies generated and which cause electron energy to be forced to escape from the matter at an accelerated rate. In accordance with the above, by appropriately subjecting metallic values in ore, which are in their unstable pre-metallic, crystalline state to appropriate electrical frequencies, it is believed that their character or state can be rapidly altered to a metallic state.

It is theorized that since metal isotopes are the resulting matter of the previous metal, after a loss of electron energy therefrom, it is possible by suitably subjecting the isotopes to electronic bombardment to replace the energy lost and to thereby reverse the rate of decay and to reconstitute the matter to its metallic form.

In the case of accelerating decay by applied electrical frequency and harmonics and/or in the case of reconstructing isotopes by applied energy, it is probable that only those very unstable pre-metallic crystalline values which are ready or near ready to change to a metallic state are or can be effected and that only those very unstable isotopes which have just or recently changed from a metallic state are or can be effected, as noted above. Such applied energy is believed to have little and possibly no material effect on matter which is in or which attains a stable metallic state.

It is an object and feature of the present invention to provide a process of the general character referred to above wherein the ore is subjected to electrical frequencies and harmonics which, it is believed, accelerate the rate of decay of certain unstable pre-metallic, crystalline metal values in the ore and convert them into a metallic state.

It is an object and feature of the present invention to provide a process of the character referred to above wherein ore is subjected to electronic bombardment which, it is believed, recharges unstable metal isotopes with energy previously lost through material decay and reconstructs the isotopes to a stable metallic state.

An object and feature of this invention is to provide a process of the character referred to wherein the rate of decay of unstable pre-metallic matter and unstable metal isotopes are changed to a stable metallic state by subjecting them to high frequency electrical energy.

In the art of smelting ore, attempts have been made to generate the necessary smelting temperatures by conducting an electric arc through a body of dry or moistened ore. Such attempts have failed to gain effective results as too much of the values sought to be reduced and recovered are vaporized by the high temperatures encountered and are lost to the atmosphere.

It is an object and feature of the present invention to provide a novel process of the general character referred to wherein an electric arc is conducted through a slurry of water and ore whereby metal vapors generated from the ore and by the heat of the arc are immediately condensed and prevented from escaping to the atmosphere.

Still another object and feature of this invention is to provide a process of the character referred to wherein the frequency of the electric arc conducted through the slurry of ore and water is adjusted and set so that the frequency of the arc is substantially the same as the natural frequency of the metal sought to be recovered and so that the frequency and harmonics to which the pre-metallic, crystalline metal values are subjected is such that those values tend to alter or change themselves whereby they correspond to the applied frequency and/or harmonics and become stable metallic values.

Yet another object and feature of the present invention is to provide a process of the character referred to wherein the frequency of the electric arc conducted through the slurry of ore and water is adjusted and set so that the frequency of the arc is substantially the same frequency as the metal sought to be recovered and so the frequency to which the metal isotopes are subjected is such that those values tend to accept suitable applied electron energy and once again become stable metal values.

It is another object and feature of this invention to subject the ore to a number of distinct frequencies and to varying frequencies whereby different unstable crystalline and isotopic metal values are caused to change to their stable metal state.

It is an object and a feature of the present invention to provide a process of the general character referred to wherein the temperature of the ore is rapidly heated by the heat energy of electric arcs and is rapidly cooled by the water in which it is carried whereby the ore is effectively and rapidly broken down or reduced as a result of the induced rapid expansion and contraction of those materials in the ore having different coefficients of expansion and contraction.

It is an important object and feature of the present invention to provide a process of the character referred to which is clean and not subject to creating waste and by-products which cannot be easily, effectively and economically handled and treated so as to render them non-harmful or non-polluting to the environment.

Another object of the invention is to provide a process of the character referred to that can be carried out by means of small, economical and dependable equipment, and which is economical of time and of energy.

The foregoing and other objects and features of this invention will be apparent and will be understood from the following detailed description of the invention, throughout which description reference is made to the accompanying Drawing wherein a typical apparatus provided to carry out the process is diagrammatically illustrated.

In carrying out the process provided by the present invention, the metal ore to be worked upon is first removed from its source and is suitably reduced into fine granular and/or powdered form by suitable milling means and procedures. In practice, it is generally satisfactory if the ore is milled and reduced so that it will pass through a 100 mesh screen.

The process here provided first includes mixing the ore with water to establish a fluid aqueous slurry. The amount of water or the ratio of ore and water can vary widely in practice and is established with due consideration given to its fluidity and the rate at which the slurry must be moved or caused to flow in and during the following steps or carrying forward of the process.

In addition to the required or most desirable fluidity of the slurry, the ratio of ore and water is or might be varied so that adequate water, as a cooling medium, is present in the slurry to assure proper and desired cooling of the ore, of the metals and the condensing of gases generated in the slurry when and as the process is carried forward. Certain factors which are to be considered in establishing the ratio of water and ore are, the specific gravity of the ore, its basic chemical make-up which determines the manner in which it will react when further worked upon and the capacity of the fluid handling means which are to be employed in carrying forward of the invention.

In practice, certain ore may be in the form of an aggregate of soluble salts and colloidal matter which is readily reducible in water and such that it is essentially in solution when mixed with water. In such cases, the ore and water, when mixed, might be properly termed a solution rather than a slurry. In this regard, it might be well, at this time, to note that the process here provided is not restricted to the handling of ore alone but is equally adapted to and suitable for use in the extraction and collecting of metal values from metal ladened waters and waste solutions such as are found in certain wells or the like and as are commonly discharged in the course of carrying out various industrial activities.

In accordance with the above and in light of the broader aspects of the invention, the process here provided is intended and suitable for extracting and collecting metal from aqueous solutions containing metal values.

The slurry or aqueous solution is normally cool and well below the boiling temperature of the water and far below the smelting temperatures of the metals present.

In carrying forward the process here provided, the slurry or aqueous solution is conducted and circulated by and within electric arc generating means whereby the metal values in the solution are subjected to the high temperature of electric arcs generated by the arc generating means and whereby said metal values are subjected to electron bombardment by the electric arcs. The temperature of the arcs is well above the smelting temperature of the metals and serves to melt certain of the free metals present and, it is believed, to vaporize certain of the free metals and other metal values present.

The metal vapors are immediately cooled and condensed by the water of the slurry or solution and establish free metal.

Due to the tendency of particles of pure metals to attract and to coalesce with other particles of the same metal, the particles of free metal rendered molten by the arcs combine and fuse and the metal vapors which are generated are attracted to, coalesce with and condense on the fused particles of metal.

The above action is believed to be a proper explanation of what takes place and is believed evidenced by the fact that the metals separated and recovered by carrying out of the present invention are presented and found in small beads of pure gold, silver, copper, platinum and the like. All of the above specifically mentioned metals are commonly and frequently produced from a single ore and, in most instances, are presented in separate beads of the pure metals.

In addition to the smelting effect of the heat generated by the arcs to which the metal or metal values are subjected, the electrons of the electric energy of the arcs bombard the unstable crystalline and/or isotopic metal values to induce and cause those values to change in character or state. In the case of at least some of those unstable metal values, the change or alteration of their character or state is to a stable metallic state or condition and such that they coalesce and combine with the other of their metals present, and as above described.

The extent to which the above takes place cannot be determined, but it is believed safe and accurate to state that it does occur.

In addition to the above action of the bombardment of the unstable crystalline and/or isotopic metal values by electrons of the arcs, those metallic values are subjected to and excited by the high frequencies of the electrical energy of the arcs which frequency excitation is believed to unbalance the natural frequencies of those values and induces the unstable pre-metallic crystalline metal values to release electronic energy and decay to their next stable metal state and/or to excite and condition the unstable isotopic metal values in such a manner that certain of those values accept the necessary electrons, which are presented by the arcs, to return them to their previous stable metal state.

Again, the extent to which the above takes place cannot be accurately determined but it is believed safe and accurate to state that it does, in at least certain instances.

In support of the above, in practice, it has been found and demonstrated that by adjusting the frequency of the electric energy of the arcs to or near the natural frequency of a particular metal found in a particular ore, the amount of that metal recovered by means of the instant process is noticeably and materially increased. Further, by adjusting several arcs to the frequencies of several different metals found in a particular ore, the production or recovery of each of those metals is noticeably increased.

Still further, while efficient recovery is attainable with an arc or arcs at substantially any fixed, unspecific frequency, recovery is increased by constantly varying the frequency of the arc or arcs throughout the range of the natural frequencies of the metals present.

It is not certain, but it can be rationally theorized that when the noted unstable metal values are excited by the applied frequencies of the arcs, frequency harmonics are generated which induce those metal values to change and/or condition them to be changed to their next or lost stable metal state. In the case of unstable pre-metallic crystalline matter, when it is subjected to the frequency harmonics of the metal it is subject to becoming or changing to, it will readily adopt and assume that frequency and in doing so will alter its atomic structure accordingly, by releasing appropriate energy. In the case of past metallic unstable isotopes, when subjected to the frequency harmonics of its previous metal state, in the presence of free, applied electron energy, it will tend to adopt that frequency and in doing so accepts that energy which will tend to stabilize it in that state.

In accordance with the foregoing, the process of the present invention, in its preferred most effective and efficient carrying out includes subjecting the metallic values of the solution to applied electric energy at a frequency corresponding to the natural frequency of the metal.

In addition to the foregoing, the electric arc generates intense ultra violet light which light may supplement the accelerated change in state or condition of certain of the metal values.

The results of several hundred tests run on various arcs tend to substantiate the previously mentioned beliefs.

An important feature of the present invention is to effectively cool and condense the vaporized metal values rapidly and before they are permitted or allowed to raise through and exhaust from the solution. Accordingly, the solution cannot be made or let to stay in the proximity of the arc generating means and so that it would become excessively heated and vaporized to an extent that it will not effectively carry the ore in the presence of the arc and/or fail to effectively and rapidly cool and condense the vaporized metal values.

To avoid heating of the solution and gain the desired cooling and condensing of the metal vapors, it is necessary that the solution and the arc generating means be in constant relative motion whereby solution heated by the arc is moved from proximity of the arc generating means and combined with cold solution to cool it and cold solution is moved into proximity of the arc generating means to be acted or worked upon, continuously. That is, solution worked upon and heated by the arc generating means is moved therefrom to be cooled and cool solution is advanced to that means to be worked upon continuously. Further, a sufficient volume and head of solution is maintained about and above the arc generating means whereby adequate scrubbing of the metal vapors and heat exchange is assured to effect cooling and condensing of the vapors. That is to say it is necessary that a sufficient volume of cold solution be present and appropriately related to the arc generating means to assure sufficient heat exchange and scrubbing of metal values vaporized by that means to condense the vapors before they can escape from the solution. In this respect, the solution serves as a heat exchange medium to condense vapors.

It will be appreciated that the volume and head of solution required to effect the above end is subject to wide variation and is determined by the nature and capacity of the apparatus employed in carrying out the process.

In the course of smelting metal ore in accordance with commonly employed processes, the smelting temperatures generated reduce and/or change certain of the matter in the ore into a gaseous state. Many of the gases thus generated are dangerous and harmful to man and the environment and are, as a general rule, vented and exhausted into the atmosphere to pollute the environment and subject persons in the area to a risk of harm.

In carrying out of the instant invention, the above noted harmful gases are generated, but are generated within the solution and are suitably scrubbed in and by the solution to be carried and/or absorbed thereby. Accordingly, the harmful gases which are the product of smelting are not allowed or permitted to exhaust into the atmosphere but rather, are captured, contained and carried by the solution and in such a manner that they can be effectively and safely handled and disposed of.

In practice, the process here provided has been employed to treat ore containing large amounts of sulfur, arsenic, selenium and tellurium compounds with no evidence of gas emission from the solution which might result in air pollution.

After the solution has been acted and worked upon by the arc generating means and the ore in the solution has been converted and/or smelted, the solution is changed or altered to a treated solution or slurry of water, gangue and entrapped or entrained gases. The treated solution is next conducted to suitably separating or concentrating means which serve to concentrate and separate the heavy metal values from the lighter, water, gangue and entrained gases. The water, gangue and entrained gases, when separated from the metals, are waste and are suitably disposed of. In practice, the noted waste can be conveniently and economically treated to render it safe and non-polluting. For example, the waste, if acid, can have adequate lime or limestone added to it to neutralize the acid contents thereof. If desired, it may be pumped into a local mineral deposit to provide situ leaching of the desired minerals. Metals contained in the resulting leaking solution would then be recovered when run through the converter.

In the accompanying drawing, an apparatus is disclosed which is particularly suited for carrying out the process of this invention.

The apparatus is shown as including material supply means comprising a hopper H into which a supply of suitably prepared or milled ore is deposited and a related valve control water supply W. The hopper and water supply are related to a suitable motor driven mixing means M to deposit desired volumes of ore and water into the mixer at a desired rate. The mixer means M discharges the slurry or solution of water and ore established thereby into a fluid conducting converter C. The converter C is related to a suitable concentrating means T and directs the fluid flowing through the converter means to the concentrating means. The concentrating means T is shown as a typical concentrating table onto which an aqueous slurry of metal, gangue and water is deposited and which operates by shaking of the table, to cause the heavy metal particles deposited thereon to separate from the water and the gangue and to migrate to one side of the table and to drop therefrom into a suitable collector 10. The lighter water and gangue move in a different direction across the table and are discharged therefrom into a waste chute 11 for subsequent treatment and disposal.

Other means for concentrating and separating the metals from the material discharged from the converter could include sluice boxes, fluid separating means, centrifugal separators or simple manual panning means.

The combining and mixing of the ore and water can be manually effected with the use or aid of suitable shovels, buckets and containers.

The fluid conducting converter means C can vary widely in form and construction and includes generally a fluid conducting body 15 and arc generating means A to establish electric arcs in the body and through the fluid solution or slurry conducted therethrough. The means A includes anode and cathode contacts 16 and 17 in spaced relationship within the fluid passage of the body 15, direct current generating means G and frequency control means F between and connected with means G and the anode contacts.

In the preferred form of apparatus, the body is an elongate, vertical, cylindrical body of dielectric material, such as asbestos cement, with open upper and lower inlet and outlet ends and defining a central flow passage. There is preferably a plurality of anode contacts, which contacts are arranged in circumferential spaced relationship about the body in a single horizontal radial plane at the lower portion thereof and which have portions engaged through openings in the body to communicate with the interior thereof, that is, with the flow passage defined thereby.

The cathode contacts are arranged and related to the body to occur in predetermined spaced relationship from the anode contacts and are suitably grounded. The contacts are established of highly conductive material, such as carbon and are spaced so that upon the establishment of a suitable potential, an arc can be established therebetween, through a water medium, that is, through the slurry or solution of ore and water.

It is to be noted that the converter body is non-conductive and is electrically isolated except for a power supply line from the generating means G to the anode contacts and a ground line to the cathode contacts. The solution is poured or permitted to fall freely in a broken stream into the converter and drops or pours therefrom in a like manner so that grounding of the converter through the fluid conducted therethrough cannot take place.

In the preferred apparatus and as illustrated, the cathode contacts are carried by a cylindrical flow directing and flow control member 20 rotatably supported in the lower portion of the body, concentric therein and with a cylindrical side wall occuring in predetermined spaced relationship with the side wall of the body to define an annular flow passage of limited area in and through which the slurry must flow. The cathode contacts are carried in circumferential spaced relationship within the member 20 on a common plane with the anode elements and extend through openings in the member to communicate with the passage and occur in exposed relationship with the anode contacts. A suitable drive means D is provided to rotate the flow directing and cathode carrying member.

Upon the supply of current to the anodes and upon rotation of the member 20, the circumferentially spaced sets of contacts are rotated relative to each other and, in such a manner that the relative spacing of the anode and cathode contacts is constantly increased and decreased. The noted variation in spacing of the contacts is such that when they are in their closest position relative to each other, an arc will establish itself therebetween and so that when they reach their greater spaced relationship, the arc can no longer be maintained and is broken.

In addition to the above, the member and circumferential spacing of the contacts 16 and 17 are different and such that but one or a controlled number of arcs, less than the number of contacts is established at one time and so that the capacity of the generating means G to establish an arc generating potential between the related points is not exceeded.

The frequency control means F can be any suitable manually adjustable frequency modulating means or device and is preferably provided with a osciloscope on which the sine wave of the tuned frequency is presented. The means F is adjusted and set so that the frequency of the current supplied to the anode contacts and the resulting frequency of the arcs generated is the same as the natural frequency of the metal sought to be recovered. Setting of the frequency can be readily and conveniently effected by means of the osciloscope by matching of the sine wave of the current supply with the known sine wave of the metal.

Such adjustment of the current is not imperative to obtain profitable results, but is necessary to obtain most efficient and profitable results.

In practice, if desired, several sets of contacts 16 and 17 with independent frequency control means F related thereto can be provided, so that arcs with frequencies matching the distinct frequencies of several different metals presented by an ore being treated are generated within the converter.

In practice, the anode and cathode contacts can be provided in fixed relationship at opposite sides of the body and the flow passage therein and power to the anodes can be controlled by a suitable distributor switching means.

If desired, one pair of contacts might be provided at the opposite sides of a restricted flow passage and a continuous arc maintained therebetween. In such a case, the slurry or solution would be forced through the passage and by the arc at a set rate to assure the ore is effectively worked on by the arc.

A sufficient volume, rate of flow and head on the slurry or solution is maintained above the contacts, so that vapors and gases generated by the arc and slurry are cooled sufficiently to be condensed in the solution or are scrubbed sufficiently to be absorbed or entrained in the solution to discharge from the converter therewith and are not subject to exhausting from the solution and escaping to atmosphere.

Having described only typical preferred forms and applications of my invention, I do not wish to be limited or restricted to the specific details herein set forth, but wish to reserve to myself any modifications and/or variations that may appear to those skilled in the art to which this invention pertains and which fall within the scope of the following claims.

Having thus described our invention, we claim:

1. The process of separating and collecting metals from ore which comprises; first, mixing granulated ore with water to establish a fluid aqueous slurry, second, subjecting portions of the fluid aqueous slurry to electric arcs to raise the temperature of the metallic values of the arc and in the presence of the arc to temperatures at and above the melting point of the values whereby certain of those values are rendered molten and others are vaporized; third, permitting the molten and vaporized metals to coalesce; fourth, cooling and condensing the metal vapors and cooling molten metals by heat exchange with portions of the fluid aqueous slurry adjacent to and about the portions of the fluid subjected to the arc whereby the metals are cooled, condensed and solidified within the fluid aqueous slurry and; finally, separating the solid metals fro the fluid aqueous slurry.

2. The process set forth in claim 1 wherein the metal values in the fluid aqueous slurry include unstable matter which is near to a stable metal state and which has a natural frequency near the natural frequency of the metal; said process further including subjecting said unstable matter to an arc the frequency of which induces that matter to change in frequency to the natural frequency of the metal and to thereby assume a stable metal state.

3. The process set forth in claim 1 wherein the metal values in the fluid aqueous slurry include unstable matter which is near to a stable metal state and which distinguishes from a stable metal by the missing of certain electron energy, said process further including subjecting said unstable matter to bombardment by the electron energy of the arc whereby the missing electron energy is introduced into the matter and it assumes a stable metal state.

4. The process as set forth in claim 3 wherein the metal values in the fluid aqueous slurry include unstable matter which is near to a stable metal state and which has a natural frequency near the natural frequency of the metal; said process further including subjecting said unstable matter to an arc the frequency of which induces that matter to change in frequency to the natural frequency of the metal and to thereby assume a stable metal state.

5. The process as set forth in claim 1 wherein those metal values rendered molten, vaporized and reduced to a gaseous state in the presence of the arcs are ionized, whereby the ionized values are caused to move and converge toward a common pole and into coalescing proximity with each other.

6. The process as set forth in claim 5 wherein the metal values in the fluid aqueous slurry include unstable matter which is near to a stable metal state and which has a natural frequency near the natural frequency of the metal; said process further including subjecting said unstable matter to an arc the frequency of which induces that matter to change in frequency to the natural frequency of the metal and to thereby assume a stable metal state.

7. The process set forth in claim 5 wherein the metal values in the fluid aqueous slurry include unstable matter which is near to a stable metal state and which distinguishes from a stable metal by the missing of certain electron energy, said process further including subjecting said unstable matter to bombardment by the electron energy of the arc whereby the missing electron energy is introduced to the matter and it assumes a stable metal state.

8. The process set forth in claim 5 wherein the metal values in the fluid aqueous slurry include unstable matter which is near to a stable metal state and which has a natural frequency near the natural frequency of the metal; said process further including subjecting said unstable matter to an arc the frequency of which induces that matter to change in frequency to the natural frequency of the metal and to thereby assume a stable metal state.

* * * * *